United States Patent [19]

Kubo et al.

[11] Patent Number: 4,896,349
[45] Date of Patent: Jan. 23, 1990

[54] COMMUNICATION CONTROLLER IN A HOME BUS SYSTEM

[75] Inventors: Seiichi Kubo, Hirakata; Naofumi Nakatani, Takatsuki, both of Japan

[73] Assignee: Matsushita Electric Industrial Co., Ltd., Kadoma, Japan

[21] Appl. No.: 175,669

[22] Filed: Mar. 25, 1988

Related U.S. Application Data

[63] Continuation of Ser. No. 843,621, Mar. 25, 1986, abandoned.

[30] Foreign Application Priority Data

Mar. 26, 1985 [JP] Japan .................................. 60-61144

[51] Int. Cl.$^4$ .......................................... H04M 11/00
[52] U.S. Cl. ...................................... 379/107; 379/90; 375/36; 333/119
[58] Field of Search ................. 379/90, 106, 107, 338, 379/402, 443; 375/36; 333/119; 336/182, 183; 307/11, 12, 45, 155

[56] References Cited

U.S. PATENT DOCUMENTS

| | | | |
|---|---|---|---|
| 3,503,016 | 3/1970 | Podell | 379/391 X |
| 4,480,298 | 10/1984 | Fry | 307/11 X |
| 4,717,896 | 1/1988 | Graham | 333/25 |
| 4,766,402 | 8/1988 | Crane | 333/25 |
| 4,800,344 | 1/1989 | Graham | 333/25 |

FOREIGN PATENT DOCUMENTS 6017880 1/1960 Japan .

OTHER PUBLICATIONS

"A Revised New Proposal for Standardization of Home Bus System for Home Automation" and Home Bus System (HBS) Interface LSI and its Standard Protocol Example, IEEE Transactions on Consumer Electronics, Feb. 1986, vol. CE-32, No. 1, pp. 1-19.
Microtran Co. Inc., Engineering Application Bulletin F232-6/72, "Telephone Coupling Transformers", Valley Stream, N.Y., Jun. 1972.

Primary Examiner—Keith E. George
Attorney, Agent, or Firm—Cushman, Darby & Cushman

[57] ABSTRACT

A communication controller in a home bus system comprises a single pulse transformer having two secondary windings connected respectively to a coaxial cable and a pair of wires, to which a personal computer, a television receiver, a sensor, etc. are connected. The controller is provided for transmitting a communication packet to the coaxial cable or the pair of wires and the system automatically transmits the communication packet from the pair of wires to the coaxial cable or vice versa.

7 Claims, 3 Drawing Sheets

COMMUNICATION CONTROLLER IN A HOME BUS SYSTEM

This is a continuation of application Ser. No. 843,621, filed Mar. 25, 1986, which was abandoned upon the filing hereof.

FIELD OF THE INVENTION AND RELATED ART STATEMENT

1. Field of the Invention

The present invention is related to a communication network, and particularly to a communication network using different kinds of information transmission media for electric domestic devices such as a personal computer, a television receiver, an electronic security system, a bath room control system, an air conditioning system, etc., particularly for a home bus (network) system with a simple constitution and smooth communication.

2. Description of the Related Art

An example of a conventional home bus system is described in FIG. 1.

Domestic devices such as a personal computer 12, a television receiver 13, a sensor 14 and a meter 15 are connected respectively to a communication apparatus 8, another communication apparatus 9, still another communication apparatus 10 and further another communication apparatus 11 which transmit and receive communication packets. The communication apparatus 8 and the communication apparatus 9 are connected to a coaxial cable 16 as an information transmission medium. The communication apparatus 10 and the communication apparatus 11 are connected to a balanced cable, which is hereinafter referred to as pair of wires 17, as an information transmission medium. The coaxial cable 16 is connected to a secondary winding of a pulse transformer 6. The pair of wires 17 is connected to a secondary winding of a pulse transformer 7.

One terminal 6a of a primary winding of the pulse transformer 6 is connected to a power supply 18 and the other terminal of the primary winding is connected to a collector of a transistor 2b of a switching circuit 2 and is also connected to a base of a transistor 3a of an amplifier 3 through a resistor 3b of the amplifier 3.

A base of the transistor 2b of the switching circuit 2 is connected to a microprocessor 1 through a resistor 2a. An emitter of the transistor 3a of the amplifier 3 is connected to the power supply 18, and a collector of the transistor 3a is connected to the microprocessor 1 and to ground through a resistor 3c of the amplifier 3.

A switching circuit 4 has the same constitution as that of the switching circuit 2 and an amplifier 5 has the same constitution as that of the amplifier 5.

The switching circuit 2 amplifies a digital (data) signal sent from the microprocessor 1 and supplies the amplified digital signal to the coaxial cable 16 through the pulse transformer 6. The amplifier 3 supplies a digital signal sent from the coaxial cable 16 to the microprocessor 1.

The switching circuit 4 amplifies a digital signal sent from the microprocessor 1 and supplies the amplified digital signal to the pair of wires 17 through the pulse transformer 7. The amplifier 5 supplies a digital signal from the pair of wires 17 to the microprocessor 1.

The microprocessor 1 controls the use of the channels of the coaxial cable 16 and the pair of wires 17 as the information transmission media. The microprocessor 1 interrupts temporarily a communication of low priority when an emergency communication packet comes, and gives priority to the emergency communication packet. Further, when the use of an empty channel is requested by a domestic device, the microprocessor 1 gives a license to use an empty channel for the communication apparatus of the requesting device. Further, the microprocessor 1 is connected to a subscriber telephone line 99 through a network control unit 20 and a modem 21, thereby enabling outside comunication.

A protocol communication is executed on the coaxial cable 16 and on the pair of wires 17.

A control apparatus 19 comprises the above-mentioned power supply 18, the switching circuits 2 and 4, the amplifiers 3 and 5, the microprocessor 1, the network control unit 20 and the modem 21. An address set circuit 22 is for setting an address of the control apparatus 19.

The coaxial cable 16 has a wide band range and therefore facilitates frequency-division multiplexing cummunication. The coaxial cable 16 can facilitate multiplexing communication of a high frequency-modulated video or audio signal, such as a broadcasting wave signal and a low frequency base band signal, for transmitting information between the communication apparatus 8 or 9 and the control apparatus 19. But, coaxial cable 16 is relatively expensive, and therefore, is usually used only in necessary parts.

The pairs of wires 17 have a narrower band area than the coaxial cable 16, but the pair of wires 17 are lower in cost than the coaxial cable 16. Therefore, at positions where only the base band signal is transmitted, the pair of wires 17 are used.

Thus, the information transmission media are selected responding to various usages. The computer 12 and the television receiver 13, treating high frequency data, are connected to the coaxial cable 16, and the terminals of the sensor 14 and the meter 15 which execute only the base band communication of the status information and/or the control information are connected to the pair of wires 17 through the communication apparatus 10 or 11.

Then, the operation of the example of FIG. 1 is described as follows.

When the data of the meter 15 is searched by the personal computer 12, a communication packet about the requests of the meter data from the personal computer 12 is supplied to the coaxial cable 16 through the communication apparatus 8. The communication packet is supplied to the amplifier 3 through the pulse transformer 6, is amplified therein and supplied to the microprocessor 1. The microprocessor 1 recognizes that the communication packet is to be transmitted to the pair of wires 17 and supplies the communication packet to the pair of wires 17 through the switching circuit 4 and the pulse transformer 7. The communication apparatus 11 recognizes that the communication packet is for the communication apparatus 11 as such and supplies the communication packet to the meter 15. The meter 15 supplies a data packet to the pair of wires 17 through the communication apparatus 11. The data packet is supplied to the amplifier 5 through the pulse transformer 7. The amplifier 5 amplfies the data packet and supplies the data packet to the microprocessor 1. The microprocessor recognizes that the data packet is to be transmitted to the coaxial cable 16 and supplies the data packet to the coaxial cable 16 through the switching circuit 2 and the pulse transformer 6. The communication apparatus 8 recognizes that the data packet is for the communication apparatus 8 as such and supplies the data of the meter 15 to the personal computer 12.

The network control unit 20 is connected to the subscriber telephone line 99 and has a dialing function and a detecting function of a ringing signal. The network control unit 20 connects the subscriber telephone line 99 to the modem 21 after dialing. When the network control unit 20 detects a ringing signal, the network control unit 20 turns on the direct current circuit, and the network control unit 20 connects the subscriber telephone line 99 to the modem 21.

Thus, the modem 21 receives digital data as a sequence of "0"s and "1"s from the microprocessor 1 and analog-modulates the data, thereby to send the signal as an audio signal to the subscriber telephone line 99. Further, the modem 21 receives the audio signal from the subscriber telephone line 99 and converts the analog signal to digital data of a sequence of "0"s and "1"s and supplies the digital data to the microprocessor 1.

However, in the above-mentioned conventional home bus system, the number of the switching circuits and the amplifiers which are necessary to respond to the number of the kinds of the information transmission media is large. Therefore, the control apparatus becomes complicated and becomes expensive.

Further, in the above-mentioned conventional home bus system, the control apparatus should always control the communication over the information transmission media. In the control apparatus generally using a single CPU, when communication packets are sent from the plural kinds of information transmission media simultaneously, a problem occurs in that the control apparatus accepts only a communication packet with top priority and rejects the other communication packet.

Further, the communication packet issued from each communication apparatus is supplied once to the control apparatus and then is supplied to other communication apparatus. Therefore, a problem occurs in that a long delay of the packet transmission occurs in response to an increase of the information to be processed by the control apparatus.

Further, while the control apparatus is sending the communication packet to a communication apparatus of an information transmission medium, the control apparatus cannot accept the communication packet of the other information transmission medium.

OBJECT AND SUMMARY OF THE INVENTION

The present invention is intended to resolve the above-mentioned disadvantages of the conventional network bus system.

The bus system of the present invention comprises:

a pulse transformer comprising plural secondary windings, a control apparatus connected to a primary winding of the pulse transformer, plural kinds of information transmission media connected respectively to the plural secondary windings of the pulse transformer, the information transmission media being a coaxial cable and a pair of wires, at least a communication apparatus connected to each information transmission medium, and electric domestic devices connected to the communication apparatuses.

Thus the present invention has the following advantages.

That is, the bus system of the present invention can provide a system in which only one switching circuit and one amplifier are sufficient for data transfer irrespective of the use of plural kinds of information transmission media. Therefore, the bus system of the present invention is economical.

Further, in the control apparatus of the present invention it is enough to control only one switching circuit and one amplifier.

Even when the communication packets are simultaneously produced on the plural information transmission media, the communication apparatuses which issue communication packets can detect a collision.

Because, the communication packet issued from each communication apparatus is sent to the control apparatus and at the same time to all the information transmission media, the communication packets can be transmitted without delay irrespective of the processing ability of the control apparatus.

DESCRIPTION OF THE PREFERRED EMBODIMENTS

Figure 1:
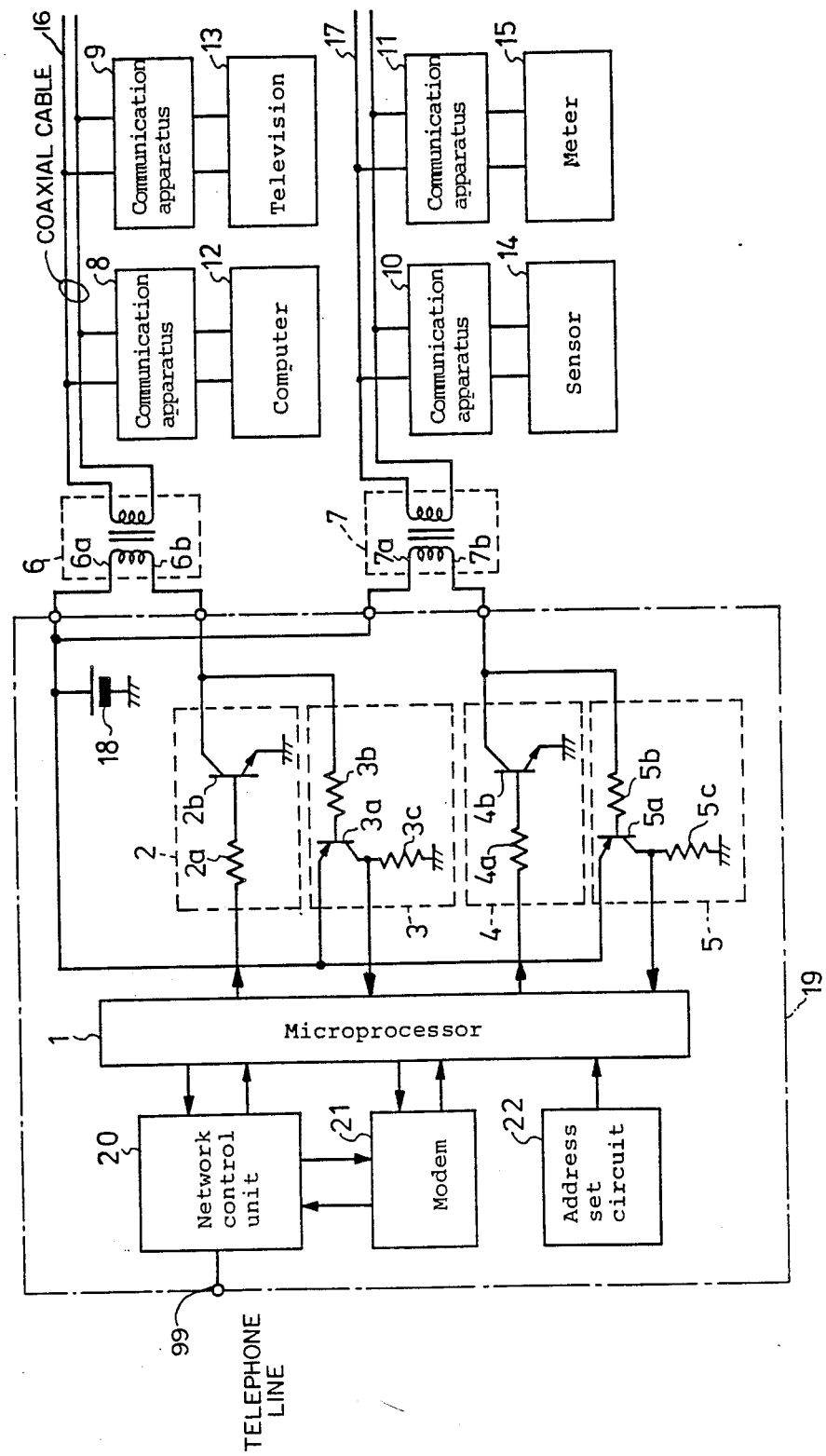
FIG. 1 is a block diagram showing the conventional home bus system.
Figure 2:
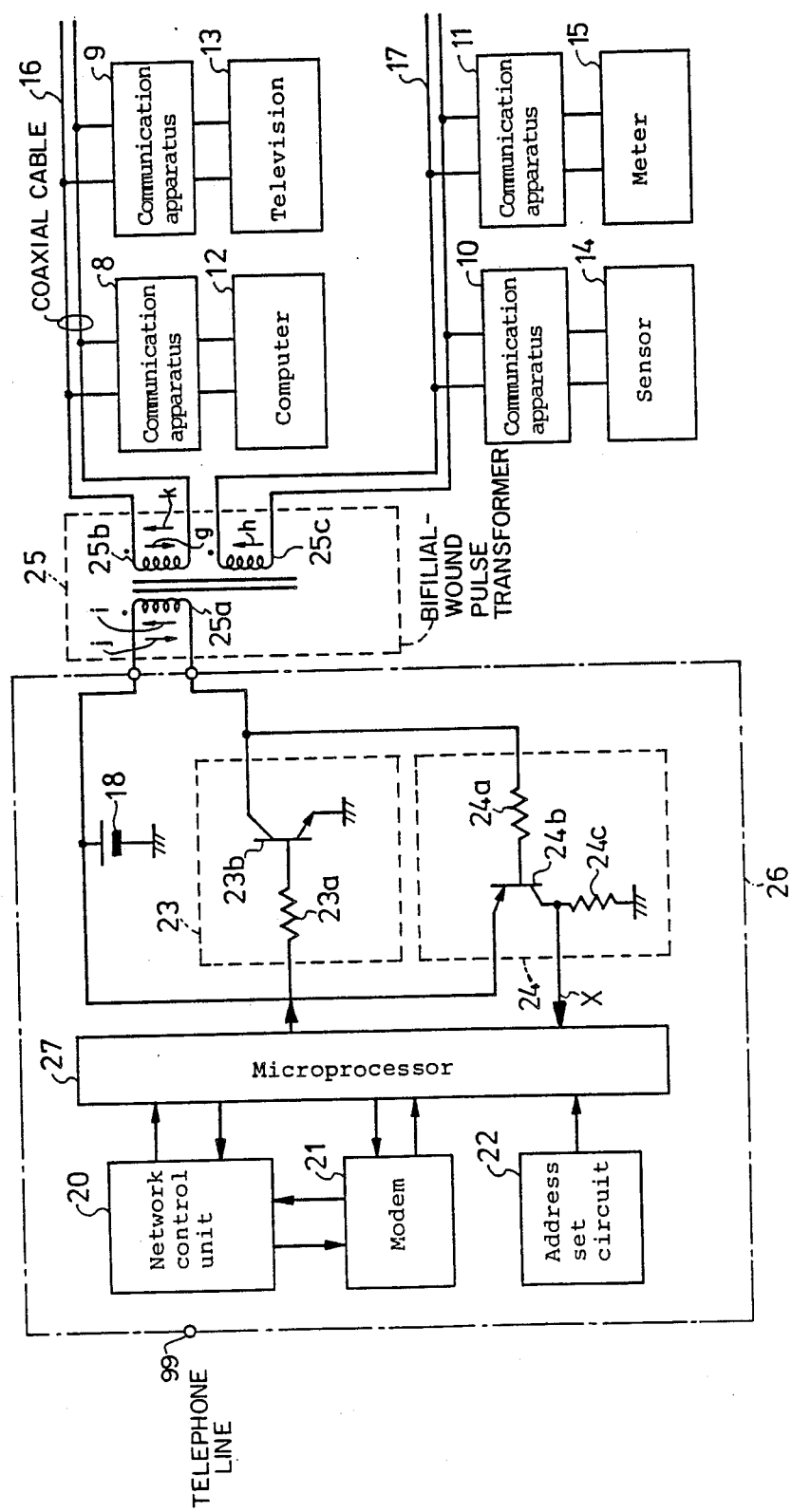
FIG. 2 is a block diagram showing an embodiment of a home bus system of the present invention.

FIG. 2 is a block diagram showing an embodiment of a home bus system of the present invention.

Domestic devices such as a personal computer 12, a television receiver 13, a sensor 14 and a meter 15 are connected respectively to a communication apparatus 8, a communication apparatus 9, a commmunication apparatus 10 and a communication apparatus 11 which transmit and receive communication packets. The communication apparatus 8 and the communication apparatus 9 are connected to a coaxial cable 16 as an information transmission medium. The communication apparatus 10 and the communication apparatus 11 are connected to pair of wires 17 as an information transmission medium. The coaxial cable 16 is connected to a secondary winding 25b of a pulse transformer 25. The pair of wires 17 is connected to a secondary winding 25c of the pulse transformer 25.

One terminal of a primary winding 25a of the pulse transformer 25 is connected to a power supply 18 and the other terminal of the primary winding 25a is connected to a collector of a transistor 23b of a switching circuit 23 and is also connected to a base of a transistor 24b of an amplifier 24 through a resistor 24a of the amplifier 24.

A base of the transistor 23a of the switching circuit 23 is connected to a microprocessor 27 through a resistor 23a. An emitter of the transistor 24b of the amplifier 24 is connected to the power supply 18, and a collector of the transistor 24b is connected to the microprocessor 27 and to ground through a resistor 24c of the amplifier 24.

The pulse transformer 25 has a plural number of secondary windings. The secondary windings 25b and 25c of the pulse transformer 25 are configured in a bifilar winding, thereby making the coupling coefficient high. An attenuation of the signal from the pair of wires 17 to the coaxial cable 16 or the signal from the coaxial cable 16 to the pair of wires 17 is decreased by selecting the direct current resistance of the secondary windings 25b and 25c to be small. Therefore the transmission loss is small. Further, the direct current resistance of the primary winding 25a of the pulse transformer 25 is selected to be larger; and the turn ratio of the primary winding 25a, the secondary winding 25b and the secondary winding 25c is selected 1:1:1, in order to make the transmitting power of the control apparatus 26 to the cable 16 and the pair of wires 17 low. The communication packet consists of a sequence of digital data of "0"s and "1"s. And the wave form of the digital data over the transmitting medium is a pulse-width-modulation (PWM) wave form.

The operation of the above-mentioned embodiment is described as mentioned below.

A pulse signal of the PWM code issued from the communication apparatus 8 or 9 is supplied to the coaxial cable 16. Therefore, a current flows in the secondary winding 25b of the pulse transformer 25 in a direction indicated by an arrow (g), thereby causing a current flow through the secondary winding 25c of the pulse transformer 25 in a direction indicated by an arrow (h). Thus the pulse signal is sent on the pair of wires 17. At the same time a current flows through the primary winding 25a of the pulse transformer 25 in a direction indicated by an arrow (i). Thus a base current flows in the transistor 24b of the amplifier 24. The flowing of the base current induces a flow of collector current, thereby producing a voltage drop across the resistor 24c and increasing the voltage of the input terminal X of the microprocessor 27.

The signal issued from the communication apparatus 10 or 11 is supplied to the coaxial cable 16 and the control apparatus likewise.

Then, when no pulse signal is on the coaxial cable 16 and the pair of wires 17, the input terminal X of the microprocessor 27 always has ground potential.

Next, when the microprocessor 27 issues the communication packets, the operation of the bus system is as described below.

The transistor 23b of the switching circuit 23 is turned on by the pulse signal from the microprocessor 27 through the resistor 23a. Then collector current flows, and thereby a current flows through the primary winding 25a of the pulse transformer 25 in a direction indicated by an arrow (j). Therefore, a current flows through the secondary winding 25b of the pulse transformer 25 in a direction indicated by an arrow (k), thereby supplying the pulse signal to the coaxial cable 16. At the same time, a current flows through the secondary winding 25c of the pulse transformer 25 in a direction indicated by an arrow (h). Therefore, the pulse signal as same as the above-mentioned pulse signal on the coaxial cable 16, is supplied to the pair of wires 17.

The collector current flowing in the transistor 23b of the switching circuit 23 also produces a base current in the transistor 24b of the amplifier 24. The base current generates the collector current of the transistor 24b, thereby producing the voltage drop across the resistor 24c. Therefore, the voltage of the input terminal X of the microprocessor 27 is increased. The microprocessor 27 recognizes whether the communication packet is for the microprocessor 27 as such or not, thereby having a monitor function. Thus the pulse signal issued from the control apparatus 26 can be transmitted to all information transmission media.

Next, a more detailed communication between the meter 15 and the personal computer 12 is described referring the FIG. 2 as follows.

When the personal computer 12 searches the data from the meter 15, the communication packet for requesting meter data (hereinafter referred to as a requesting packet) from the personal computer 12 is supplied to the coaxial cable 16 through the communication apparatus 8. The pulse signals of the requesting packet are supplied to the secondary winding 25c and the primary winding 25a of the pulse transformer 25. The pulse signals of the requesting packet of the secondary winding 25c are supplied to the pair of wires 17 and the communication apparatus 11 recognizes that the requesting packet is for the meter 11. Then the communication apparatus 11 sends the requesting packet to the meter 15.

On the other hand, the pulse signal produced on the primary winding 25a is supplied to the microprocessor 27 through the amplifier 24.

The meter 15, requested of data, supplies the detected data packet to the pair of wires 17 through the communication apparatus 11. The data packet is supplied to the coaxial cable 16 through the pulse transformer 25 and at the same time is supplied to the microprocessor 27 through the pulse transformer 25 and the amplifier 24.

The communication apparatus 8 recognizes that the data packet on the coaxial cable 16 is for the personal computer 12 as such and sends the detected data to the personal computer 12.

Next, an embodiment is described below, in which the unusual status information detected by the sensor 14 is displayed on the screen of the television receiver 13.

The unusual status information packet detected by the sensor 14 is supplied to the pair of wires 17 through the communication apparatus 10. The unusual status information packet is sent to the coaxial cable 16 and to the amplifier 24 through the pulse transformer 25. The communication apparatus 9 recognizes that the unusual status information packet on the coaxial cable 16 is the one directed for the television receiver 13, and sends the unusual status information detected by the sensor 14 to the television receiver 13. At the same time, the unusual status information packet supplied to the amplifier 24 is sent to the microprocessor 27.

Figure 3:
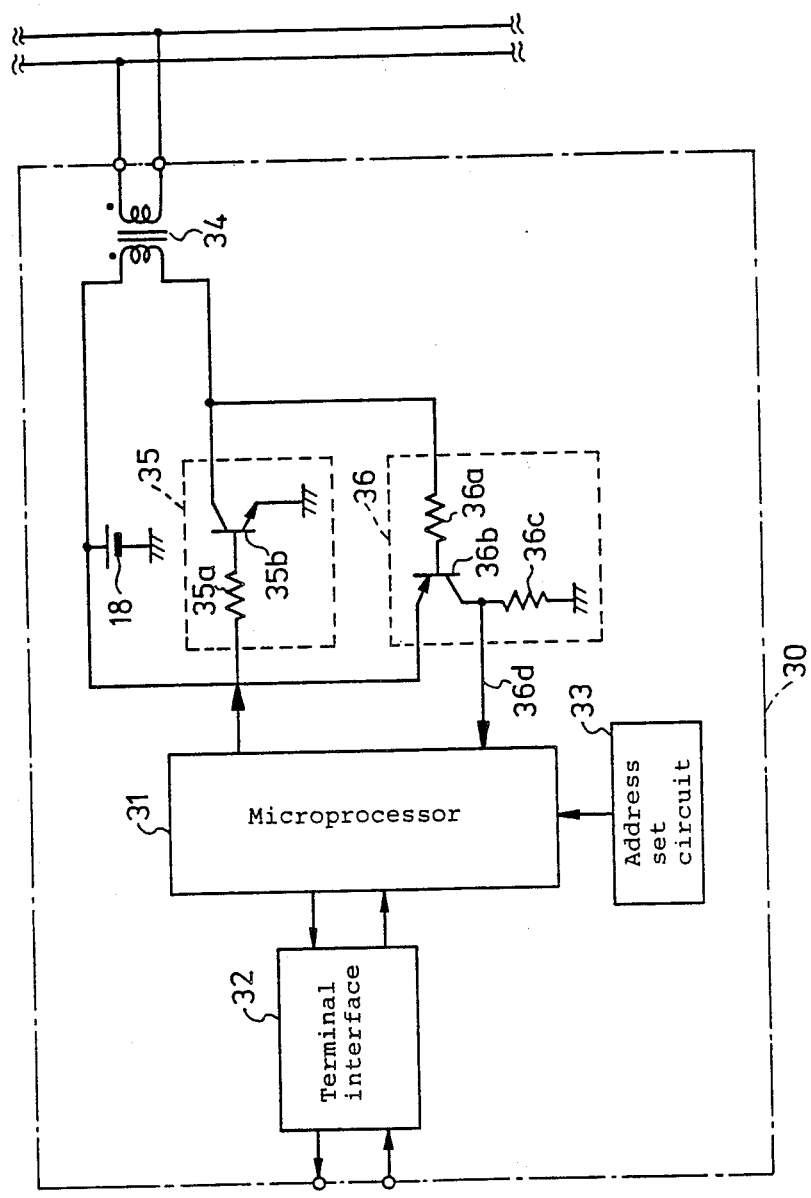
FIG. 3 is a block diagram showing a communication apparatus of an embodiment of the present invention.

The communication apparatuses 8, 9, 10 and 11 in FIG. 2 are described as follows referring to FIG. 3.

Each communication apparatus 8, 9, 10 and 11 has a switching circuit 35 and an amplifier 36, the constitutions of which are same as the switching circuit 23 and the amplifier 24 of the control apparatus 26 in FIG. 2.

The control function of the communication apparatus is executed by the microprocessor 31. The microprocessor 31 receives the communication packets on the information transmission medium from an amplifier 36 through a pulse transformer 34. The microprocessor 31 judges whether the communication packet is a packet for the own communication apparatus or not by utilizing the address code set by the address setting circuit 33. When the communication packet is for the communication apparatus as such, the communication apparatus analyzes the contents of the received packet and sends the information in the packet to the electric domestic device as such or controls the device as such through a terminal interface 32.

Further, when an information or a command is supplied to the microprocessor 31 through the terminal interface 32, the microprocessor 31 composes a communication packet for the information transmission medium from the received information or the received command and drives the switching circuit 35 and sents the communication packet to the information transmission medium through the pulse transformer 34. The detailed operation of the switching circuit 35 and the amplifier 36 are the same as those of the embodiment of FIG. 2.

What is claimed is:

1. A bus system comprising:
   a pulse transformer including a primary winding and plural secondary windings being wound on a common core, said plural secondary windings being wound bifilarily for obtaining good coupling,
   plural kinds of information transmission medium connected, respectively, to said plural secondary windings of said pulse transformer, said plural kinds of information transmission medium including a coaxial cable and a pair of wires,
   plural communication apparatuses connected to said plural kinds of information transmission medium,
   electric domestic devices respectively connected to different ones of said plural communication apparatuses, and
   control means connected to a primary winding of said pulse transformer for monitoring said plural kinds of information transmission medium, said control means facilitating sending and receiving operations of communication packets between said plural communication apparatuses, respectively connected to different ones of said coaxial cable and pair of wires, through said secondary windings.

2. A bus system in accordance with claim 1, further comprising
   a personal computer and a television are connected to said communication apparatuses connected to said coaxial cable, and
   a sensor and a meter connected to respective ones of said plural communication apparatuses connected to said kinds of information transmission medium.

3. A bus system in accordance with claim 1, wherein
   a direct current resistance of each of said plural secondary windings of said pulse transformer being smaller than that of said primary winding of said pulse transformer.

4. A bus system in accordance with claim 1, wherein turn ratio of said primary winding and each of said plural secondary windings of said pulse transformer is 1:1.

5. A bus system comprising:
   a pulse transformer comprising a primary winding and two secondary windings being wound on a common core, said two secondary windings being wound bifilarly for obtaining good coupling,
   a coaxial cable connected to one of said two secondary windings,
   a pair of wires connected to the other one of said two secondary windings,
   control means connected to a primary winding of said pulse transformer and to a subscriber telephone line for monitoring said coaxial cable and said pair of wires and for carrying out receiving and sending operations of communication packets between communication apparatuses,
   a picture display apparatus connected to said coaxial cable through a communication apparatus, and
   a sensor and a meter each connected to said pair of wires through a corresponding communication apparatus.

6. A bus system in accordance with claim 5, wherein
   a direct current resistance of each of said two secondary windings of said pulse transformer is smaller than that of said primary winding of said pulse transformer.

7. A bus system in accordance with claim 6, wherein turn ratio of said primary winding and each of said two secondary windings of said pulse transformer is 1:1.

* * * * *